United States Patent
Riddiford et al.

(10) Patent No.: US 10,057,466 B2
(45) Date of Patent: Aug. 21, 2018

(54) DIGITAL VIDEO CAMERA

(71) Applicant: TomTom International B.V., Amsterdam (NL)

(72) Inventors: Martin Riddiford, London (GB); Christopher James Taylor, London (GB); Frank De Jong, London (GB); Yu-Chyuan Tseng, New Taipei (TW); Hadyn Macquire Lyall Van Der Berg, Surbiton (GB); Jonathan Heath, Barnet (GB); Eveline Anna Kleinjan, London (GB)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 15/565,168

(22) PCT Filed: Apr. 29, 2016

(86) PCT No.: PCT/EP2016/059611
§ 371 (c)(1),
(2) Date: Oct. 9, 2017

(87) PCT Pub. No.: WO2016/174201
PCT Pub. Date: Nov. 3, 2016

(65) Prior Publication Data
US 2018/0091708 A1   Mar. 29, 2018

(30) Foreign Application Priority Data

Apr. 29, 2015   (GB) .................................. 1507348.9

(51) Int. Cl.
*H04N 5/225* (2006.01)
*G03B 17/02* (2006.01)

(52) U.S. Cl.
CPC ........... *H04N 5/2252* (2013.01); *G03B 17/02* (2013.01)

(58) Field of Classification Search
CPC .............................. H04N 5/2252; G03B 17/02
See application file for complete search history.

(56) References Cited

U.S. PATENT DOCUMENTS

| | | | |
|---|---|---|---|
| 5,634,162 A | 5/1997 | Suzuki | |
| 8,244,118 B2 * | 8/2012 | Stansbury | G03B 17/08 310/337 |

(Continued)

FOREIGN PATENT DOCUMENTS

| | | |
|---|---|---|
| CN | 104394303 A | 4/2015 |
| EP | 0649251 B1 | 4/1995 |
| JP | 2009300558 A | 12/2009 |

OTHER PUBLICATIONS

TomTom. 2013 "TomTom Bandit Reference Guide", tomtom.com [online], Available from: http://download.tomtom.com/open/manuals/bandit/refman/TomTom-Bandit.

(Continued)

*Primary Examiner* — Padma Haliyur

(57) ABSTRACT

A digital video camera is disclosed comprising a substantially cylindrical camera body defining a longitudinal axis, and first and second user inputs arranged on a wall of the camera body, wherein one of the first and second user inputs is arranged on a side wall of the camera body in a plane that is generally parallel to the longitudinal axis, and the other of the first and second user inputs is arranged on an end wall of the camera body in a plane that is generally orthogonal to the longitudinal axis, one of the first and second user inputs being actuable to start recording and the other of the first and second user inputs being actuable to stop recording.

12 Claims, 2 Drawing Sheets

(56) References Cited

U.S. PATENT DOCUMENTS

| | | | |
|---|---|---|---|
| 9,851,623 B2* | 12/2017 | Macmillan | G03B 37/04 |
| 2004/0156616 A1 | 12/2004 | Strub et al. | |
| 2005/0174480 A1 | 8/2005 | Nakamura | |
| 2009/0251311 A1 | 10/2009 | Smith et al. | |
| 2011/0273590 A1 | 11/2011 | Kojima et al. | |
| 2013/0235234 A1 | 12/2013 | Cucci et al. | |
| 2014/0267743 A1 | 9/2014 | Tapia et al. | |
| 2015/0036047 A1 | 5/2015 | Bledsoe | |
| 2016/0182850 A1* | 6/2016 | Thompson | H04N 9/8205 348/158 |
| 2016/0191862 A1* | 6/2016 | Yokomitsu | H04N 5/772 348/158 |

OTHER PUBLICATIONS

Search Report dated Oct. 28, 2015 for GB Application No. 1507348.9.
Further Search Report dated Feb. 4, 2016 for GB Application No. 1507348.9.
International Search Report dated Jun. 9, 2016 for application No. PCT/EP2016/059611.

* cited by examiner

DIGITAL VIDEO CAMERA

CROSS-REFERENCE TO RELATED APPLICATIONS

The present application is a National Stage of International Application No. PCT/EP2016/059611, filed on Apr. 29, 2016, and designating the United States, which claims benefit to United Kingdom Patent Application 1507348.9 filed on Apr. 29, 2015. The entire content of these applications is incorporated herein by reference.

FIELD OF THE INVENTION

This invention relates to digital video cameras having improved functionality. Such digital video cameras may, in particular, find use during outdoor activities and action sports, e.g. cycling, mountain biking, hiking, climbing, skiing and snowboarding, surfing, sky diving, etc. Such video cameras may therefore be point of view (POV) video cameras that are arranged to be mounted to a user's clothing, helmet or other apparel, or to a piece of sports or fitness equipment, such that the video camera records footage substantially from the perspective or POV of the user while they are performing an activity or sport.

BACKGROUND OF THE INVENTION

Video cameras that are marketed for use during action sports generally have a simplified user interface as compared to standard video cameras. So-called "action cams" typically use a two-way slider on an outer surface of the camera body that a user can toggle between a recording mode being on (REC) or off (STOP). The recording mode slider may include a lock that can be activated to prevent accidental knocks having an effect. While such a control can be simple and intuitive, the absence of other user inputs on the surface of the camera body prevents more advanced camera functions from being controlled.

Furthermore, wearable video cameras are often mounted to a helmet, bicycle, surfboard, etc to capture action footage and can be mounted in different orientations. This means that the user interface has to be accessible regardless of the mounting position of the camera. This often precludes the use of any inputs other than a single large slider that is easily accessible from different sides of the camera. Again, this limits the functionality available to a user.

SUMMARY OF THE INVENTION

According to a first aspect of the present invention there is provided a digital video camera comprising a substantially cylindrical camera body defining a longitudinal axis, and first and second user inputs arranged on a wall of the camera body, wherein one of the first and second user inputs is arranged on a side wall of the camera body in a plane that is generally parallel to the longitudinal axis, and the other of the first and second user inputs is arranged on an end wall of the camera body in a plane that is generally orthogonal to the longitudinal axis, one of the first and second user inputs being actuable to start recording and the other of the first and second user inputs being actuable to stop recording.

It will be appreciated that such a user input arrangement separates the start and stop functions between two different user inputs. This makes it harder for a user to accidentally start or stop recording, especially when the orientation of the user inputs may change depending on the way in which the camera is mounted. By arranging the first and second user inputs in different orthogonal planes, a user can easily find each input without needing to look at the camera to see how it is orientated. A two-way slider, on the other hand, may need to be moved forwards to start recording in one orientation of the camera but if the camera is inverted then a backwards movement would be required instead. This can result in confusion between moving the slider to start and stop recording, unless the user first checks the orientation of the slider, which is often not possible when the camera is mounted out of view or the user is in the middle of an activity.

In embodiments, the user input on the side wall of the camera body is arranged, when actuated, to stop recording, and the user input on the end wall of the camera body is arranged, when actuated, to start recording.

The video camera is a digital video camera comprising at least one data store, e.g. memory, for storing video data, and optionally other data such as audio, that is recorded by the camera. The at least one data store may be a removable memory card, such as an SD (Secure Digital) card. The video data may be recorded using a digital media container, such as the AVI container format or MP4 container format. Digital media containers comprise a payload (or data) portion and one or more metadata portions. The payload (or data) portion includes the media data, typically with each of the data types, e.g. video, audio, etc, in the container being interleaved (or multiplexed). The one or more metadata portions contain data about the container and the media data (or content) contained therein. For example, the one or more metadata portions can include data such as: the number of streams (or tracks), e.g. video, audio, etc; the format of each stream, e.g. the type of compression, if any, used to encode each stream; and the duration of the media data; all of which are required to read the data in the container and to subsequently provide the content. The one or more metadata portions can also include information about the content in the container, such as a title, an artist name, etc.

The actuation of the user input to start recording preferably causes a new container to be opened, and for the recorded video and/or audio data to be added to the payload portion of the file. Similarly, the actuation of the user input to stop recording preferably causes the opened container to be closed; with the metadata about the recorded video and/or audio data being added to the metadata portion of the container, so as to create a media file.

A further advantage of separating the user inputs to start and stop recording is that a least one of the first and second user inputs may provide an additional function. For example, simultaneously actuating the first and second user input, e.g. by pressing and holding the user inputs for a predetermined period of time, such as two seconds, can cause the video camera to switch between operating states, e.g. power on, power off, etc. Furthermore, for example, additionally and/or alternatively, initial actuation of the first (or second) user input may start recording, but further actuation(s) of the same user input will not stop recording because that function belongs to the other second (or first) user input. Such further actuation(s) may instead function to control the recording in another way, for example by identifying one or more times (or moments) of interest in the video data as it is being recorded, e.g. for use by the user when subsequently playing and editing the video data. Such a "tagging" function may be provided by either the user input that acts to start recording, or by the user input that acts to stop recording.

This is considered novel and inventive in its own right. Thus, according to a second aspect of the present invention there is provided a digital video camera comprising a first user input actuable to start recording and a separate, second user input actuable to stop recording, wherein at least one of the first and second user inputs is further actuable to identify one or more times of interest in the video data as it is being recorded.

Such a separate arrangement of the user inputs means that tagging can be achieved quickly and safely, i.e. without accidentally interfering with the overall recording mode. It will be understood that identifying one or more times of interest in the video data, known as "tagging", may comprise inserting a marker in the video data as it is being recorded and saved. This can enable a user to "tag" an event of interest as it happens, with the inserted marker making it quick to locate the corresponding segment when playing back or processing the video data.

The tagging function preferably, however, causes data identifying the one or more times of interest to be added to a metadata portion of the file that is created after recording has stopped. As will be appreciated, the addition of such data to the metadata portion of the file should be contrasted to causing a marker to be added to the payload portion of the file, e.g. by causing one or more black (or substantially black) frames to be present in the video stream of the file, such that these frames can be easily located at a later time. The data in the metadata portion of the file preferably acts as a pointer to the time in the file at which the first or second user input was actuated to create the tag, e.g. by comprising a time offset from the beginning of the file. In embodiments, the tag, e.g. the time offset from the beginning of the file, can be temporarily stored in a memory of the camera, e.g. buffered, until the container is closed and the completed metadata (with the tagging data) added to create the file. The actuation of the user input to create a tag, i.e. a time or moment of interest in the video data, therefore preferably comprises adding a pointer to the time from the beginning of the recorded video data to a metadata portion of the file containing the recorded video data, optionally after the file is closed, e.g. after the actuation of the user input to stop the current recording session.

As will be appreciated, the user input actuable to create a tag, i.e. to identify a time of interest in video data currently being recorded, can be used multiple times during a recording session so as to create multiple tags. Each of these tags preferably comprises a separate pointer in the metadata portion of the file pointing to each moment when the user input was actuated.

The additional tagging function may be achieved by further actuating the first and/or second user input. However it may be preferable for only one of the first and second user inputs to provide this additional function. Preferably the first user input actuable to start recording is further actuable to create a tag for the video data as it is being recorded. Accordingly, the first user input is preferably actuable to both start recording and subsequently create tags to video data, while the second user input is separately actuable to stop recording at any time. This means that, even if a user forgets that recording has already been started, actuating the first user input will simply create a tag rather than recording being accidentally stopped.

In embodiments of this aspect of the invention it is preferable that the camera comprises a substantially cylindrical camera body defining a longitudinal axis, wherein one of the first and second user inputs is arranged on a side wall of the camera body in a plane that is generally parallel to the longitudinal axis, and the other of the first and second user inputs is arranged on an end wall of the camera body in a plane that is generally orthogonal to the longitudinal axis. As is discussed above, such an orthogonal arrangement of the two separate user inputs makes it easier for a user to differentiate between them, regardless of the orientation of the camera body. One of the first and second user inputs is preferably actuable to start recording, and the other of the first and second user inputs is preferably actuable to stop recording. The user input that is actuable to start recording is preferably also actuable to create a tag, i.e. mark a segment of the video data currently being recorded, e.g. as described above. Preferably, the user input on the side wall of the camera body is actuable to stop recording, and the user input on the end wall of the camera body is actuable to start recording, and preferably also to create tags.

In a set of embodiments the camera further comprises a lens barrel at one end of the cylindrical camera body. Preferably the user input arranged on a side wall of the camera body is positioned behind the lens barrel. The user input can be positioned directly behind the lends barrel, but is preferably at least closer to the end of the cylindrical camera body with the lens barrel than the end with the other user input. This means that the user input is easy to find, especially without needing to look at the camera. Even if the orientation of the camera has changed, a user will know which end of the camera body carries the lens barrel (i.e. the filming direction) and then be able to locate the user input.

As this user input is so easy to find, it may conveniently be arranged to provide the additional tagging function described above. The user input positioned behind the lens barrel may be further actuable to create a tag for the video data as it is being recorded. In at least some examples the same user input arranged on a side wall of the camera body may be actuable to start recording. In other words, a single user input for starting recording and for tagging may be positioned behind, e.g. directly behind, the lens barrel. In other examples, however, the user input positioned behind the lens barrel is actuable to stop recording.

Preferably the user input arranged on an end wall of the camera body is positioned substantially centrally on the end wall, for example in coincidence with the longitudinal axis of the camera body. This user input may therefore be found in the same position regardless of rotation of the camera body. In at least some examples the user input arranged on an end wall may be actuable to stop recording. However, it is envisaged that either of the first and second user inputs may provide one of the respective start and stop functions.

In any of the embodiments described above, it is preferable that the first and/or second user input comprises a one-way button, i.e. a button that when depressed by a user initiates the function assigned to the button, before automatically returning to its non-depressed state. Where the user inputs are arranged in orthogonal planes, this means that the respective buttons are actuable in orthogonal directions to one another. This further helps to ensure that a user can easily operate the camera to start or stop recording, for example even when wearing thick gloves for outdoor activities.

In a preferred set of embodiments, a user interface having input means for further controlling the camera is arranged on a side wall of the cylindrical camera body. The functionality of the camera may thereby be extended beyond the first and second user inputs. The user interface may comprise one or more manually operable buttons. In one example the user interface comprises a four-way button. Such a user interface may be actuable to toggle between different modes and menus. In addition, or alternatively, the user interface may comprise a touch screen. Such a touch screen may also provide the user interface with a display function.

Preferably the user interface is arranged on the same side wall of the camera body as one of the first and second user inputs. This means that the various controls are accessible together on one side of the camera. The substantially cylindrical camera body may have a flattened side wall that carries the user interface and one of the first and second user inputs. To help a user to easily differentiate between the user interface and the other user input, preferably the user interface is longitudinally spaced from the user input that is actuable to start or stop recording.

In at least some examples, the camera may comprise a display arranged substantially in the same plane as the user interface. Accordingly both the display and user interface may be equally accessible/visible for a given orientation of the camera body. The display may conveniently be positioned between the user interface and the user input that is actuable to start or stop recording. The display can therefore help to separate the user input from the user interface so as to reduce the risk of one being accidentally actuated instead of the other. In addition, the display may be spaced apart from the user interface and/or the user input on the same side wall. The display is preferably spaced along the longitudinal axis of the camera body from the user interface and/or the user input. Whether or not they are spaced apart, the display and user interface may optionally arranged in a single integral casing, preferably forming a substantially planar unit. Such a planar unit may be arranged on a side wall of the camera body.

The orientation of the camera may be adjusted simply by holding or mounting the camera in different positions. In a preferred set of embodiments the camera includes a mounting system that is connected to the camera body so as to enable the camera to adopt one or more of a number of different orientations. In such embodiments a mounting system may be rotatably connected to the camera body. Further preferably, the mounting system may comprise a base portion for mounting the camera to another object and at least one ring member, preferably at least two ring members, arranged to surround the camera body and rotate around the longitudinal axis of the camera body during use. It will be understood that such a mounting system can be rotated around the camera body, so that the angular orientation of the whole camera can be adjusted relative to the mounting system (or vice versa). Thus, even once the base portion is mounted in position to an object such as a helmet, the camera body can still be rotated to adjust the horizon in the recorded video data. Rotation of the camera body relative to the mounting system can ensure that the user interface is easily accessible regardless of the orientation of the mounting system.

In various embodiments, the ring member(s) may be arranged to rotate around the longitudinal axis of the camera body by up to 90°, 180°, 270° or even rotation through substantially 360°. However, it may be preferable to limit the total range of rotation to a maximum of up to about 270° or less, preferably up to about 180°. Such a range of rotation may be defined with reference to the position of the user interface. In a preferred set of embodiments the mounting system is arranged to have a neutral position where its base portion is at an opposite side of the camera body to the user interface. In other words, the base portion may be diametrically opposite the user interface in this neutral position. The ring member(s) may be arranged to rotate around the longitudinal axis of the camera body by up to about ±90° relative to such a neutral position. This means that the base portion of the mounting system does not have to rotate past the user interface, or other components, on an opposite side wall of the camera body. Otherwise clearance may be needed between the mounting system and the camera body, for example between the base portion and the camera body. This may also avoid interference with the way in which the base portion mounts the camera to another object.

In some embodiments, automatic adjustment of the horizontal image plane may be achieved using an orientation sensor, for example a gyroscope. However, it will be appreciated that the mounting system allows the camera to always be mounted to a surface, such that the camera is in the same orientation. Thus, in some embodiments, automatic adjustment of the horizontal image plane is not required. For example, the horizontal image plane can be aligned with a particular orientation of the camera, such as wherein the user input on the side wall, and preferably also the user interface and/or display, are facing vertically upwards. The user is therefore able to rotate the camera body relative to the base portion of the mounting system, such that the user input on the side wall, and preferably also the user interface and/or display, are facing upwards, which means that the user knows the image plane of the camera is horizontal.

The ring member(s) could be arranged to rotate substantially freely around the longitudinal axis of the camera body during use, allowing for ease of adjustment in the camera's angular position. However the weight distribution of the camera may result in a tendency for the camera body to rotate relative to the mounting system rather than staying in a mounting position chosen by a user. It may therefore be preferable for the mounting system to include some resistance to rotation of the ring member(s) relative to the camera body. This could be achieved, for example, by providing a friction lining between the ring member(s) and the camera body. In a preferred set of embodiments, at least one of the ring members comprises a toothed internal surface. The toothed internal surface provides some resistance to rotation, so the mounting system must be forcibly rotated relative to the camera body. This enables a user to adjust the rotational position of the camera without it easily slipping out of position. The toothed internal surface may form part of a two-way ratchet mechanism, which preferably comprises two ratchet springs; one ratchet spring for the positive (clockwise) rotation relative to the neutral point, and the other ratchet spring for the negative (anti-clockwise) rotation relative to the neutral point.

The mounting system enables the camera to be mounted in position to another object, for example a helmet. The base portion of the mounting system may be mounted directly or indirectly to such an object. In various embodiments the mounting system is indirectly mounted to an object by a suitable mounting interface. The mounting system may be removably connected to such a mounting interface. The mounting interface may be adapted to a particular type of object, for example a surface mounting interface for a helmet (or other flat or slightly curved surface) or a clamping mounting interface for the handlebars of a bicycle (or other tube-shaped component).

The base portion may include one or more apertures, or any other feature, that enables a mounting interface to be removably connected to the mounting system. In a set of embodiments the base portion comprises a pair of levers arranged on top of one another to pivot in-plane and thereby enable connection or disconnection of a mounting interface to the mounting system. Such pivoting levers may act like a pair of scissors to clamp the base portion onto a mounting interface. Preferably the levers are substantially flat so as to minimise the profile of the base portion. Such pivoting levers may take the place of a chassis and act to connect together first and second parts of the base portion that, as described above, provide first and second ring members of the mounting system.

Each of the levers may include an aperture for receiving a corresponding feature of a mounting interface. Preferably the levers may be pivoted apart by a resilient member, such as a spring, so that the apertures are misaligned to thereby disable connection or disconnection of a mounting interface to the mounting system. A user must therefore force the levers together so that they are aligned one on top of the other before a corresponding feature can be engaged or disengaged. This may provide a quick-release mechanism for connecting the base portion to a mounting interface.

In such embodiments the mounting system of the camera may be removably connected to a mounting interface that is designed to engage with the base portion. The mounting interface may comprise one or more protruding T-bar features that mate with one or more corresponding apertures in the base portion, for example apertures formed in a pair of scissor-like pivoting levers. Such T-bar features may be chamfered to aid frictional engagement. Preferably the mounting interface is substantially planar except for the protruding T-bar features. However the mounting interface may have a lower surface that is flat or slightly curved, to enable the mounting interface to be seated on different objects. In addition, or alternatively, the mounting interface may comprise one or more portions formed of a compressible material. Such portions may be provided on any suitable surface of the mounting interface, but preferably on an upper surface that comes into contact with the mounting system and/or camera body. The portions of compressible material can improve the fit of the camera on the mount and help to absorb any vibrations arising from the object to which the camera is mounted, for example when the mounting interface is worn by a person during sport or physical activity.

It is preferable for the mounting system to reflect the cylindrical geometry of the camera body, so that it can be rotated around the body easily. In a set of embodiments the base portion extends along the camera body and the at least one ring member extends substantially perpendicular to the base portion. Accordingly, the base portion may run along a side wall of the cylindrical camera body while the ring member(s) engage around a circumference of the camera body. In various embodiments the mounting system preferably comprises two ring members spaced apart by the base portion. As is described above, the two ring members may be integrally formed with one or more parts of the base portion.

The mounting system may be made of any suitable material(s) including, but not limited to, metallic and/or rigid plastics materials. Where the camera is intended to be used in harsh environments it may be important for the mounting system to be rugged and able to withstand shock. In a preferred set of embodiments the base portion and/or the or each ring member is formed of spring steel, preferably spring stainless steel. This can help to make the mounting system strong and resilient. The choice of spring steel for the ring member(s) can advantageously enable a snap-fit onto the camera body.

In various embodiments, a mounting interface may be connected to the base portion in a permanent or removable manner. In many embodiments it is preferable for a mounting interface to be removably connected to the base portion of the mounting system, so as to allow different mounting interfaces to be interchanged. A user may therefore attach a mounting interface that is suitable for mounting the camera to a particular object, for example a mounting interface designed to be fixed on a helmet or other sports equipment. Preferably the mounting interface is provided by one or more of: an adhesive mount, a strap mount, a chest mount, a tripod mount, a tripod adapter, a suction cup mount, a helmet mount, a board mount, a magnetic mount, a ball joint mount, a tongue and groove mount, a strap mount, a goggle mount, an arm mount, an articulated mount, a telescoping arm, or an adaptor for retrofitting to any other kind of mount. The mounting interface may be directly formed by such a mount or attached to such a mount as an intermediate interface. The mounting interface may comprise a flat or curved surface. The mounting interface may be made of a plastics material. This can facilitate injection moulding of the interface to easily achieve a desired shape and configuration.

Some further features will now be described which can enhance the compactness and useability of the video camera. In a preferred set of embodiments the camera body houses a removable power pack comprising a battery module and a data storage module housed in a common casing to form an integrated unit. Such a power pack represents a completely different approach to the battery units normally connected to a camera, as it combines a battery module with a data storage module, such as a slot for a memory card or other data storage medium. This means that a user can quickly and easily swap the integrated unit to replace both battery and memory in one step, which is much more efficient especially when out action filming. Preferably the casing exposes one or more electrical connectors for transmitting power and data between the power pack and the camera during use. This can allow the camera to write image or video data files directly to the removable power pack. The one or more electrical connectors may provide for two-way data communication between the power pack and the camera. The camera may include a system-on-chip (SoC) processor for video data recorded in the data storage module.

Preferably the power pack is inserted at least partially into the camera body so that it is substantially protected by the camera body once installed. This can help to ensure that the power pack is shielded from knocks when the camera is used during sports activities. In a preferred set of embodiments the camera body comprises an open cavity arranged to receive the removable power pack therein. It is further preferable that the cavity has dimensions substantially matching the power pack such that, when the power pack is installed in the cavity, it forms part of a continuous surface of the camera body. Accordingly the power pack does not stand proud of the camera body, like a conventional add-on accessory, but integrates with the camera body. The resulting camera can be compact rather than bulky. Preferably the user input arranged on an end wall of the camera body is carried by the removable power pack.

The cylindrical camera body may have an opening at one end for the cavity to receive the removable power pack. This can make it quick and easy for a user to install the power pack by sliding it axially (i.e. along the longitudinal axis) into the cavity through the opening. It is convenient for the power pack to have a shape matching the cylindrical geometry of the camera body. The power pack may therefore be substantially circular in cross-section, with a circular geometry for the sealing interface (e.g. one or more O-rings). Preferably the power pack is substantially cylindrical in shape. In embodiments where the power pack is installed in an open cavity in the camera body, the cavity may also be substantially cylindrical.

A further advantage of the integrated nature of such a removable power pack is that it may more easily be made waterproof, water resistant or splash resistant e.g. using the common casing to protect both the battery module and data storage module. Furthermore, the Applicant has recognised that by combining both power and data in a single power pack it can be easier for the entire camera to be made waterproof. In a particularly preferred set of embodiments the power pack comprises a seal extending around a peripheral surface of the casing. When the power pack is installed in or on the camera body, the seal ensures that water cannot penetrate beyond the seal to reach the electrical connector(s). The seal may also prevent moisture from reaching other components of the battery module and/or data storage module. In this novel approach the power pack provides its own seal rather than trying to seal the multiple openings present in a conventional camera e.g. battery compartment and memory card slot. If the rest of the camera is waterproof then such a power pack means that an external waterproof casing may no longer be required. This represents a major advantage over existing action cameras.

In particular, the seal means that the power pack can be removed and replaced directly from the waterproof camera. It is no longer necessary to open and close a separate waterproof case when swapping over the battery during use, making it quicker for a user with less risk of missing out on action footage. Preferably the camera is waterproof to a depth of at least 5 m, 10 m, 20 m, 30 m, 40 m, or 50 m. Preferably the camera has a water resistant rating of at least IPX7. This International Protection Marking, according to IEC standard 60529, rates the degree of protection provided against liquid intrusion by mechanical casings and electrical enclosures. A rating of IPX7 means that the camera can withstand immersion in water depths of up to 1 m for up to 30 minutes. In some embodiments the camera may have a water resistant rating of IPX8, meaning that it is waterproof in depths over 1 m, and preferably in depths up to 50 m. In other words, such a waterproof camera may withstand up to 5 atm of water pressure.

The camera may further include one or more sensors. Such sensors may be chosen from one or more of: an audio receiver e.g. a microphone; an audio transmitter e.g. buzzer; a pressure sensor e.g. a barometric altimeter; an accelerometer; or a compass.

In various embodiments the camera includes a wireless transceiver, for example a short-range transceiver using infrared or radio frequency communication (e.g. Bluetooth protocol). This can enable the camera to wirelessly connect with one or more external sensors or devices, such as a heart rate monitor, cadence sensor, power meter, GPS-enabled watch, mobile telecommunications device, etc. Data from such external sensors or devices may be integrated with the image or video data recorded by the camera, and/or used to control the image or video data recorded by the camera.

The present invention in accordance with any of its aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF THE PREFERRED EMBODIMENTS

Figure 1A:
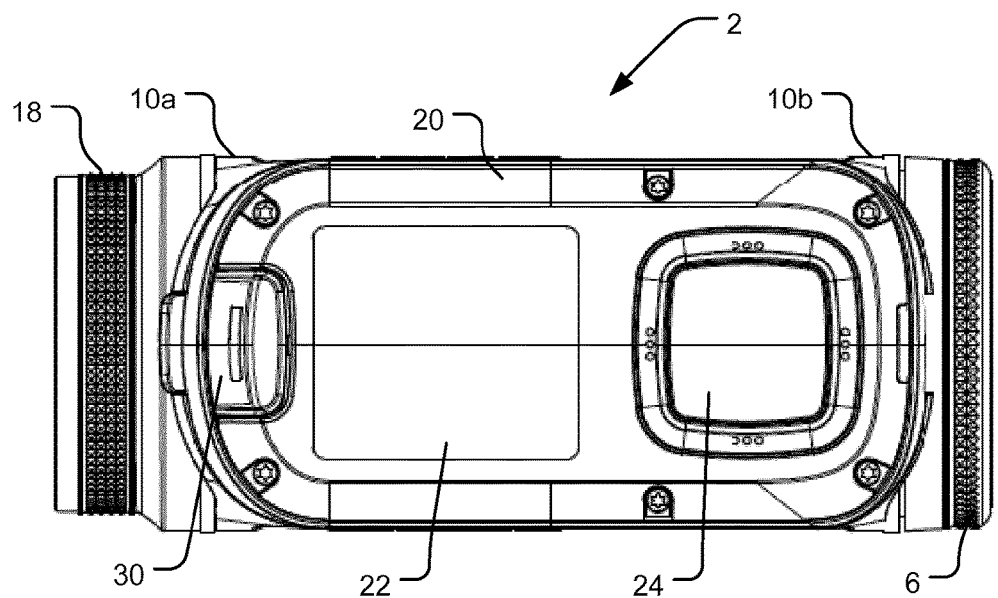
FIGS. 1A to 1D show, respectively, top, side, front and back views of a video camera according to an embodiment of the present invention.
Figure 1B:
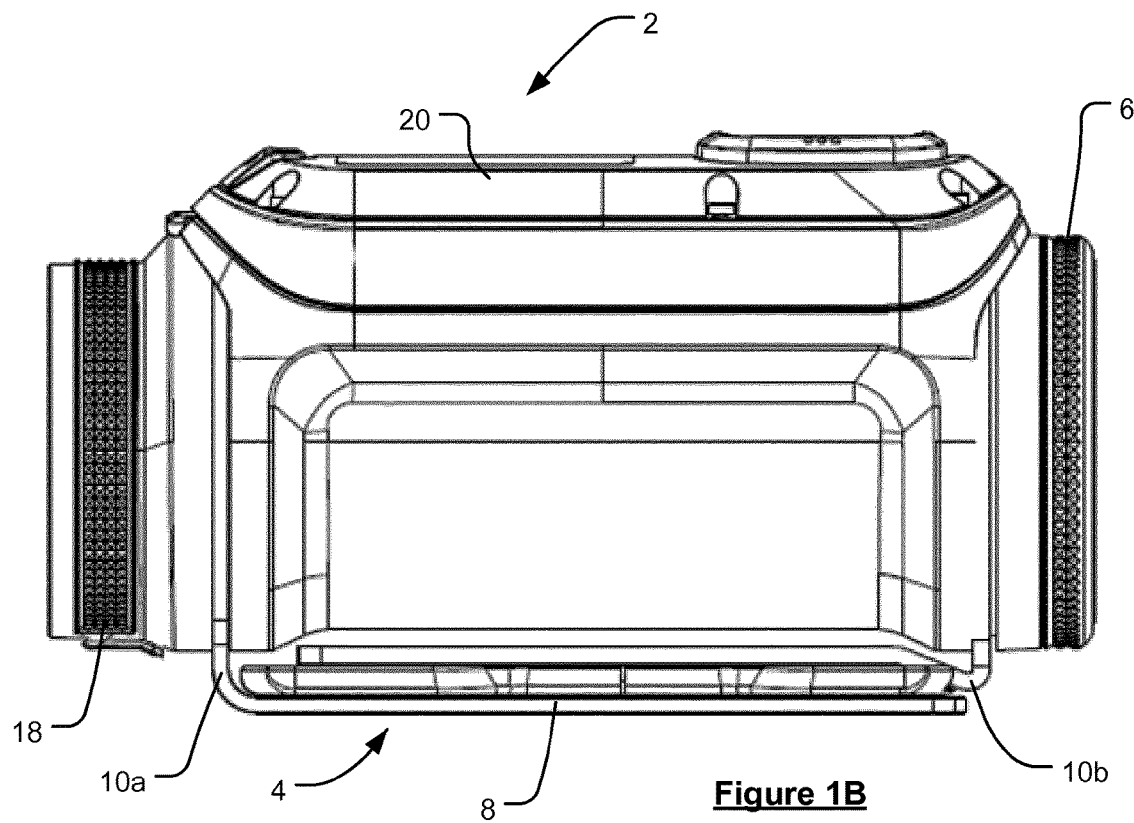
Figure 1C:
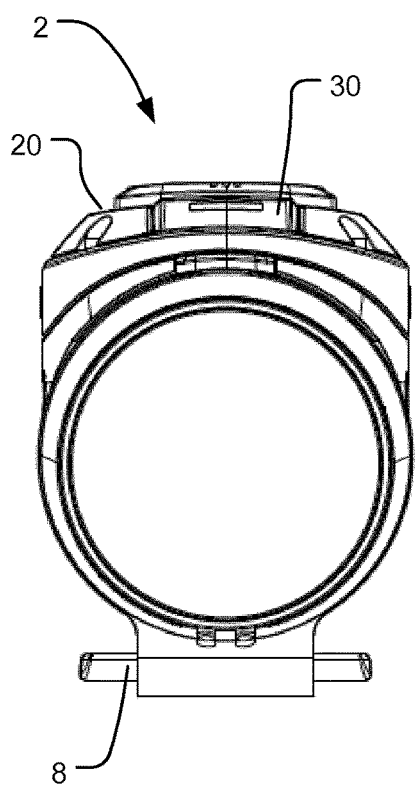

There is generally seen in FIGS. 1A to 1D a camera 2 connected to a mounting system 4. The camera 2 has a cylindrical camera body 6 defining a longitudinal axis L. The mounting system 4 is rotatably connected to the camera body 6 such that the camera 2 can be rotated around the longitudinal axis L relative to the mounting system 4. The mounting system 4 includes the two ring members 10a, 10b surrounding the camera body 6 and a longitudinal base portion 8 extending therebetween. The base portion 8 can enable the camera 2 to be removably connected to a mounting interface, for example a mount fixed on a helmet or other sports equipment.

It can be seen that a lens barrel 18 is arranged on a front end wall of the camera body 6. A first user input 30 is positioned on a top side wall of the camera body 6, directly behind the lens barrel 18. The user input 30 is a one-way button that can be pressed to start (or stop) recording. Further presses of the user input 30 function to "tag" the video recording, e.g. to mark an event of interest in the video footage. In addition, a user interface 20 is arranged on the top side wall of the camera body 6. The user interface 20 is a generally planar unit comprising a display 22 spaced longitudinally from a four-way manual input button 24.

Figure 1D:
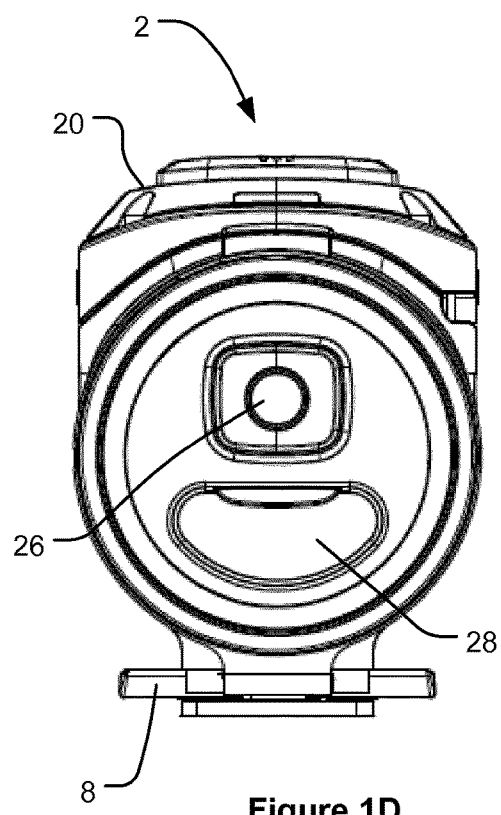

As seen in FIG. 1D, a second user input 26 is exposed on a back end wall of the camera body 6. The user input 26 is a one-way button that can be pressed to stop (or start) recording. This user input 26 may be carried on the end surface of a removable power pack that is inserted into the camera body 6.

As the user input 26 is positioned centrally in the back end wall of the camera body 6, it remains centred on the longitudinal axis L despite rotation of the camera 2 relative to the mounting system 4. Below the user input 26 there is seen an auxiliary input port 28 allowing an auxiliary power supply cable to be connected to the camera 2, in particular to a power pack installed in the camera body 6. This may be used, for example, to recharge the battery of the camera 2.

With such an arrangement of the user input buttons 26, 30, it can be appreciated that the functions of start and stop recording are actuated by separate buttons. Furthermore, the actuation directions to start and stop recording are orthogonal, which avoids confusion when a user cannot see the orientation of the camera. The user input button 30 that starts recording, and subsequently tags the video stream, is easily and quickly located due to its position directly behind the lens barrel 18.

The invention claimed is:
1. A digital video camera, comprising:
a substantially cylindrical camera body defining a longitudinal axis;

a first user input actuable to start recording of video data and a separate second user input actuable to stop recording of the video data, wherein one of the first and second user inputs is arranged on a side wall of the camera body in a plane that is generally parallel to the longitudinal axis, and the other of the first and second user inputs is arranged on an end wall of the camera body in a plane that is generally orthogonal to the longitudinal axis; and a mounting system connected to the camera body to enable the video camera to adopt one or more of a number of different orientations, wherein the recorded video data is stored in a payload portion of a digital media file stored in at least one data store of the video camera, and wherein the first user input is further actuable during recording to cause a tag to be added to a metadata portion of the digital media file, said tag comprising a pointer to the time in the recorded video data corresponding to the time at which the at least one of the first and second user inputs is actuated.

2. The video camera of claim 1, wherein the mounting system is rotatably connected to the camera body.

3. The video camera of claim 2, wherein the mounting system comprises a base portion for mounting the video camera to an object, such as a helmet, and at least one ring member arranged to surround the camera body and rotate around the longitudinal axis of the camera body during use.

4. The video camera of claim 1, further comprising a lens barrel at one end of the cylindrical camera body, wherein the user input arranged on a side wall of the camera body is positioned directly behind the lens barrel.

5. The video camera of claim 1, wherein the user input arranged on an end wall of the camera body is positioned substantially centrally on the end wall.

6. The video camera of claim 1, wherein at least one of the first and second user input comprises a one-way button.

7. The video camera of claim 1, wherein a user interface having input means for further controlling the camera is arranged on a side wall of the cylindrical camera body.

8. The video camera of claim 7, wherein the user interface is arranged on the same side wall of the camera body as said one of the first and second user inputs.

9. The video camera of claim 8, wherein the user interface is longitudinally spaced from said one of the first and second user inputs.

10. The video camera of claim 7, wherein the user interface comprises one or more manually operable buttons.

11. The video camera of claim 7, comprising a display arranged substantially in the same plane as the user interface.

12. The video camera of claim 11, wherein the display is spaced apart from the user interface.

* * * * *